(12) United States Patent
Nappa et al.

(10) Patent No.: US 12,670,238 B1
(45) Date of Patent: Jun. 30, 2026

(54) TAMPER-RESISTANT CODE OBFUSCATION WITH CONTROL FLOW BREAKING

(71) Applicant: Zimperium, Inc., Dallas, TX (US)

(72) Inventors: Antonio Nappa, Madrid (ES); Grant Stewart Goodes, Manotick (CA); Javier Lopez Gomez, Madrid (ES)

(73) Assignee: Zimperium, Inc., Dallas, TX (US)

( * ) Notice: Subject to any disclaimer, the term of this patent is extended or adjusted under 35 U.S.C. 154(b) by 0 days.

(21) Appl. No.: 19/406,523

(22) Filed: Dec. 2, 2025

Related U.S. Application Data

(60) Provisional application No. 63/752,505, filed on Jan. 31, 2025.

(51) Int. Cl.
| | |
|---|---|
| *G06F 21/14* | (2013.01) |
| *G06F 9/38* | (2018.01) |
| *G06F 9/455* | (2018.01) |
| *G06F 9/50* | (2006.01) |

(52) U.S. Cl.
CPC ........... *G06F 21/14* (2013.01); *G06F 9/5005* (2013.01); *G06F 9/5077* (2013.01); *G06F 9/3836* (2013.01); *G06F 2009/45562* (2013.01)

(58) Field of Classification Search
CPC ...... G06F 21/14; G06F 9/5005; G06F 9/5077; G06F 9/3836; G06F 2009/45562
See application file for complete search history.

(56) References Cited

U.S. PATENT DOCUMENTS

| | | | | |
|---|---|---|---|---|
| 7,340,734 | B1 * | 3/2008 | de Waal | G06F 8/447 |
| | | | | 717/151 |
| 10,095,847 | B2 * | 10/2018 | Mallon | G06F 21/16 |
| 10,394,554 | B1 * | 8/2019 | Healey | G06F 8/74 |
| 12,050,688 | B1 * | 7/2024 | Lameres | G06F 21/566 |
| 2005/0069138 | A1 * | 3/2005 | de Jong | G06F 9/3017 |
| | | | | 380/278 |

(Continued)

OTHER PUBLICATIONS

X. Yao, J. Pang, Y. Zhang, Y. Yu and J. Lu, "A Method and Implementation of Control Flow Obfuscation Using SEH," 2012 Fourth International Conference on Multimedia Information Networking and Security, Nanjing, China, 2012, pp. 336-339, doi: 10.1109/MINES.2012.25. (Year: 2012).*

(Continued)

*Primary Examiner* — Robert B Leung
(74) *Attorney, Agent, or Firm* — Fenwick & West LLP

(57) ABSTRACT

A system and a method are disclosed for providing a code obfuscation solution. The system accesses a computer program comprising a set of instructions and a sequence in which the set of instructions are to be performed. The system determines a plurality of computing resources available to perform the set of instructions and assigns the set of instructions to be distributed among the computing resources for execution. A single one of the plurality of computing resources is computationally capable of performing an entirety of the set of instructions. The system modifies the set of instructions with at least one obfuscating instruction that instructs at runtime for the computer program to jump from one computing resource to another computing resource of the set of computing resources. The system transmits the set of modified instruction to a target device for executing the computer program.

14 Claims, 10 Drawing Sheets

<u>500</u>

(56) References Cited

U.S. PATENT DOCUMENTS

| | | | | |
|---|---|---|---|---|
| 2009/0307500 | A1* | 12/2009 | Sato | G06F 21/14 |
| | | | | 713/190 |
| 2012/0246657 | A1* | 9/2012 | Abdallah | G06F 9/3888 |
| | | | | 718/102 |
| 2014/0366017 | A1* | 12/2014 | Krten | G06F 21/14 |
| | | | | 718/1 |
| 2016/0253189 | A1* | 9/2016 | Teuwen | G06F 8/74 |
| | | | | 726/22 |
| 2019/0156025 | A1* | 5/2019 | Wallace | G06F 21/54 |

OTHER PUBLICATIONS

R. Omar, A. El-Mahdy, E. Rohou, "Arbitrary control-flow embedding into multiple threads for obfuscation: A preliminary complexity and performance analysis," In Proceedings of the 2nd international workshop on Security in cloud computing, Jun. 3, 2014 (pp. 51-58). (Year: 2014).*

A. K. Dalai, S. S. Das and S. K. Jena, "A code obfuscation technique to prevent reverse engineering," 2017 International Conference on Wireless Communications, Signal Processing and Networking (WiSPNET), Chennai, India, 2017, pp. 828-832, doi: 10.1109/WiSPNET.2017.8299877. (Year: 2017).*

Google, "What is a virtual machine?" Wayback Machine, Captured Aug. 17, 2025, Retrieved from https://web.archive.org/web/20250817040342/https://cloud.google.com/learn/what-is-a-virtual-machine (Year: 2025).*

\* cited by examiner

_100_

_110_

Security Service Server

_120_

Network

_130_

Target Device

_140_

Virtual Machine

_150_

Security Module

_400_

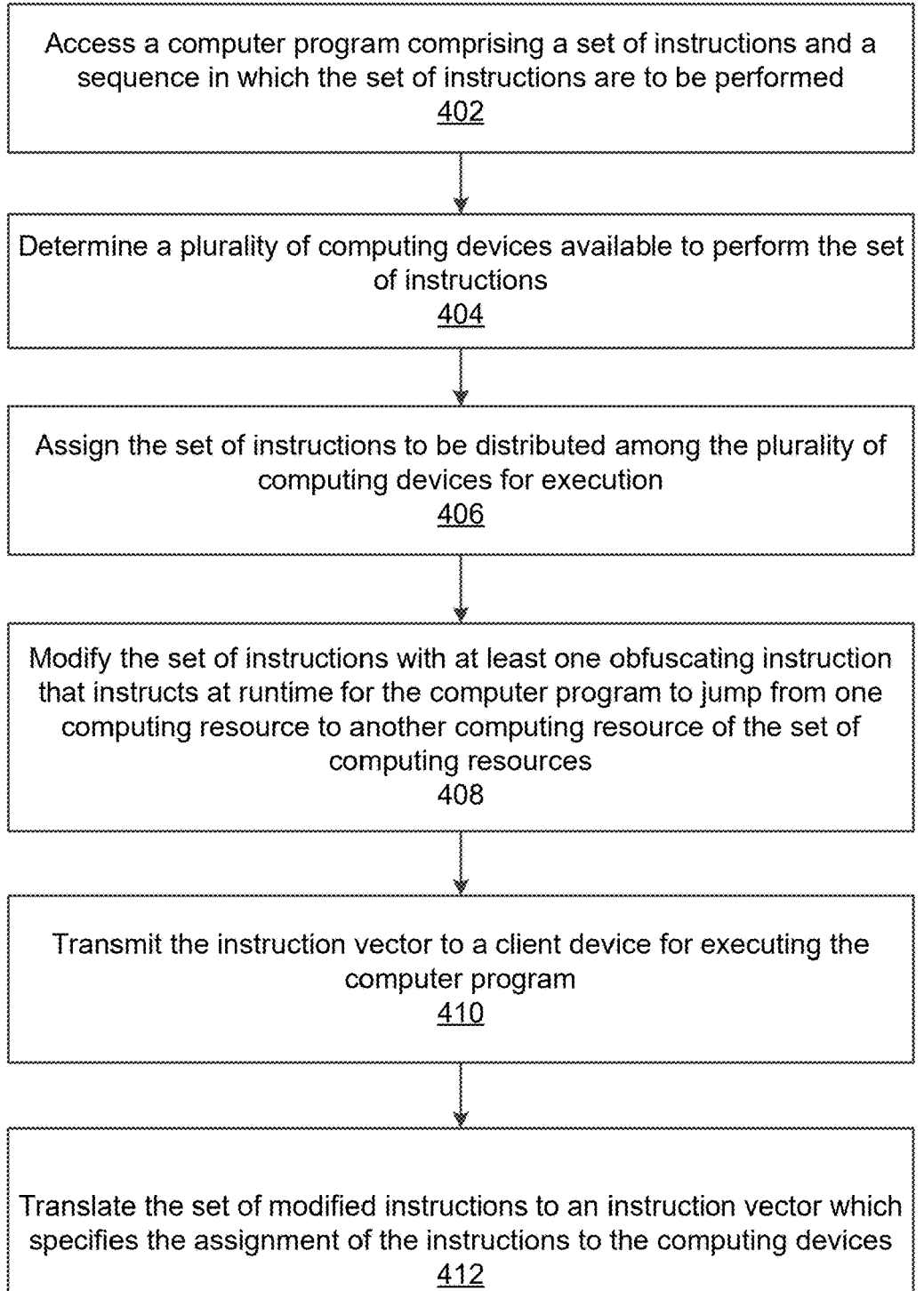

Access a computer program comprising a set of instructions and a sequence in which the set of instructions are to be performed
402

Determine a plurality of computing devices available to perform the set of instructions
404

Assign the set of instructions to be distributed among the plurality of computing devices for execution
406

Modify the set of instructions with at least one obfuscating instruction that instructs at runtime for the computer program to jump from one computing resource to another computing resource of the set of computing resources
408

Transmit the instruction vector to a client device for executing the computer program
410

Translate the set of modified instructions to an instruction vector which specifies the assignment of the instructions to the computing devices
412

*FIG. 4*

TAMPER-RESISTANT CODE OBFUSCATION WITH CONTROL FLOW BREAKING

CROSS-REFERENCE TO RELATED APPLICATION

The present application claims the benefit of U.S. Provisional Application No. 63/752,505, filed Jan. 31, 2025, which is hereby incorporated by reference in its entirety.

TECHNICAL FIELD

The disclosure generally relates to the field of computing technology, and more particularly relates to code obfuscation with control flow breaking.

BACKGROUND

Obfuscation techniques are used to intentionally make a program's source code, behavior, or logic difficult to understand, analyze, or reverse engineer. Traditional obfuscation techniques are primarily focused on making the code harder to read and reverse engineer in its static form. However, runtime techniques like reverse debugging and dynamic analysis are used by attackers to bypass many of the challenges obfuscation presents. For example, even if an attacker encounters obfuscated code that is hard to follow statically, they can still observe the program's memory while it is running and extract valuable runtime information using dynamic analysis tools. Additionally, debugging allows an attacker to step through code in real time and understand the control flow and logic, even if the program is obfuscated. In these scenarios, existing obfuscation techniques can slow down the process of reverse engineering, but may not be sufficient to prevent the attacker from understanding the application's runtime behavior.

SUMMARY

System and methods disclosed herein provide an obfuscation solution by modifying control flow of instructions in a computer program. Specifically, the method replaces a set of instructions in the computer program by, e.g., apparent non-linear control flow that may be overridden by an obfuscating unconditional jump instruction. Exploiting parallel processing primitives by executing the same code over multiple parallel threads and cores will allow the system to break tampering attempts. The obfuscating unconditional jump instruction causes the execution of the computer program to jump from one thread to another thread in a multi-thread/multi-core computing environment. A multi-core or multi-thread environment refers to a computing setup where multiple cores or threads within a processor are used to execute tasks concurrently. Exploiting parallel processing primitives over multiple parallel threads and cores will allow to break the control flow.

In one embodiment, modifying the control flow may include injecting an artificial control flow into a previously contiguous sequence of instructions; and in another embodiment, the method may modify an existing control flow. This method obscures the actual sequence of execution, for instance, by introducing jumps, threading, etc., which disrupts the natural flow of execution and complicates the program's control-flow graph. In some cases, a virtual machine (VM) deployed at a target device may interpret and transform the obfuscated instructions into one or more instruction vectors so that a plurality of computing resource may execute the instruction vectors. In the meanwhile, the redundant conditions, branches, or code that was added or modified to the original code do not affect the original flow logic and the final output so that the computer program "falls back" to its intended flow despite the apparent complexity.

In one aspect, the disclosed method includes accessing a computer program that includes a set of instructions for obfuscation. The set of instructions includes a sequence in which the set of instructions are to be performed. The sequence may refer to an execution order of the set of instructions which is determined either implicitly, by the order in which they appear in the sequence, or explicitly, by instructions that alter the control flow. The method determines a plurality of computing resources available to perform instructions and assigns the instructions to the computing resources for execution. The method modifies the set of instructions with at least one obfuscating instruction that instructs at runtime for the computer program to jump from one computing resource to another computing resource of the set of computing resources. In some embodiments, the system may provide a VM to be deployed at a target device. The obfuscated computer program may be transmitted to the target device for execution, which may cause the target device to use the VM to interpret and transform the obfuscated computer program into one or more instruction vectors. The target device is configured to execute the obfuscated computer program and achieve a same output as the computer program would output without obfuscation.

This disclosed obfuscation method modifies the control flow of a computer program, in such a way that apparent control flow differs from actual execution order enforced by obfuscating instructions. The method leverages transient executions, and utilizes one or more instruction vectors in a multi-thread/multi-core environment. Static analysis tools rely on predictable patterns to map out the program's control flow. By using obfuscated branches, the method breaks the predictability, making it difficult for static analysis tools such as disassemblers or de-compilers to reconstruct the logic. Additionally, this method uses vector instructions, e.g., SIMD (Single Instruction, Multiple Data) instructions, in unconventional ways that further obscures the program's true functionality. In this way, dynamic analysis, which involves running the program under controlled conditions (e.g., in a debugger or sandbox), is frustrated by multi-threading.

BRIEF DESCRIPTION OF DRAWINGS

The disclosed embodiments have other advantages and features, which will be more readily apparent from the detailed description, the appended claims, and the accompanying figures (or drawings). A brief introduction of the figures is below.

FIG. 4 illustrates one embodiment of a process for obfuscating a set of instruction in a computer program, according to one or more embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

Figure 1:
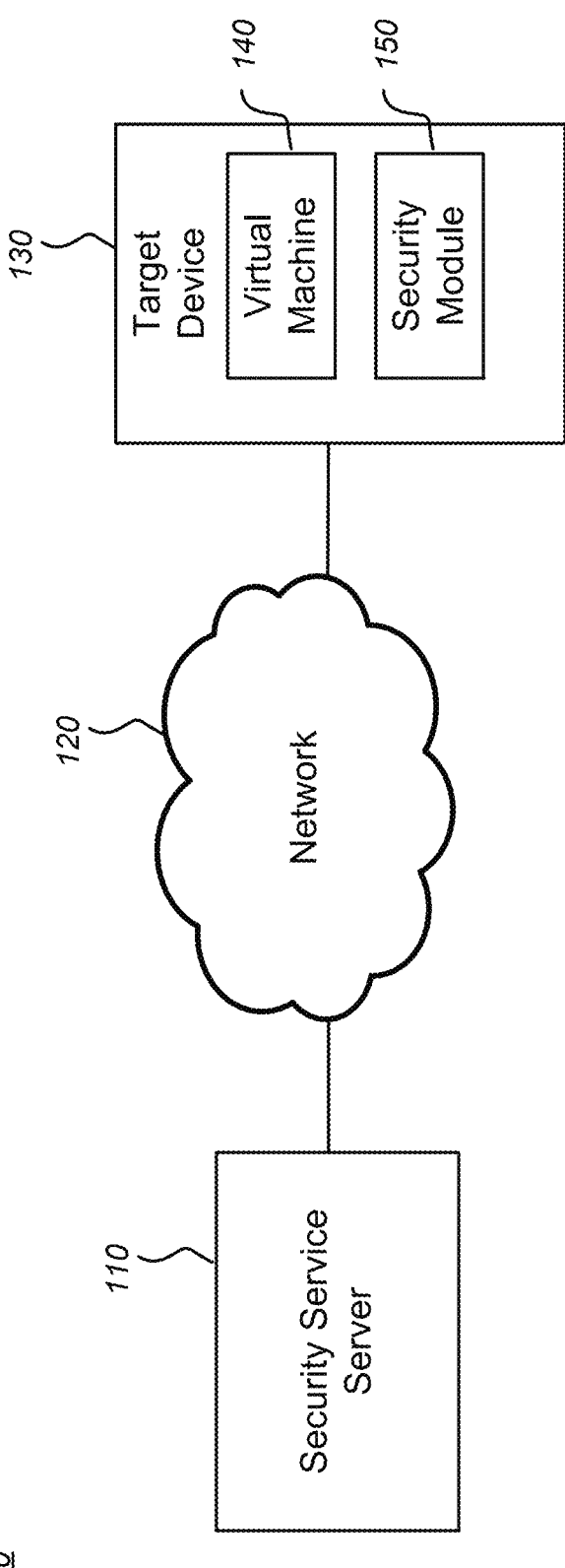
FIG. 1 illustrates one embodiment of a system environment including a computing resource with a security system, according to one or more embodiments.

FIG. 1 illustrates one embodiment of a system environment 100 including a security service server 110, according to one or more embodiments. Environment 100 also includes network 120, and a target device 130. The system environment 100 may also include different or additional entities.

The security service server 110 is a computer system configured to provide an obfuscation solution by modifying control flows of instructions in a computer program. In some embodiments, at build time, the security service server 110 may create obfuscation in the computer program. The security service server 110 may include a singular computing system, such as a single computer, or a network of computing systems, such as a data center or a distributed computing system. The security service server 110 may be one or more servers (e.g., forming a cloud-based service) that receives data and performs analysis to generate protection actions for an application. In some implementations, the security service server 110 may modify a set of instructions in the computer program with at least one obfuscating instruction. The obfuscating instruction causes the execution of the computer program to jump from one thread to another thread in a multi-thread/multi-core computing environment. In one embodiment, modifying the control flow may include injecting an artificial control flow into a previously contiguous sequence of instructions; and in another embodiment, the method may modify an existing control flow. The set of modified instructions is encoded to one or more instruction vectors to be executed in a multi-thread/multi-core environment. When executing, the obfuscated computer program executes in an original sequence of the set of instructions, despite the redundant conditions, branches, or code that added or modified to the original instructions.

The security service server 110 may access the target device 130 through the network 120. In some embodiments, the network 120 includes any combination of local area and/or wide area networks, using wired and/or wireless communication systems. The network 120 may use standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 120 may be encrypted using any suitable technique or techniques.

The target device 130 includes one or more processors configured to control operation of the target device 130 by performing functions. The target device 130 may be a server, a computing resource, an app store, a website, a physical medium (e.g., hard drive, disks, etc.), a cloud-based platform and the like. Examples of such target devices 130 include personal computers (PC), desktop computers, laptop computers, tablets, smartphones, wearable electronic devices such as smartwatches, or any other suitable electronic devices. In various implementations, a target device 130 includes a memory comprising a non-transitory storage medium on which instructions are encoded. The memory may have instructions encoded thereon that, when executed by the processor, cause the processor to perform functions.

The target device 130 may run an obfuscated computer program with obfuscating instructions. In some embodiments, the target device 130 may include a virtual machine (VM) 140. The VM 140 may be provided by the security service server 110 and installed at the target device 130. The VM 140 may interpret the computer program with the obfuscating instructions and distribute the instructions to a plurality of computing resources, the distribution across the different computing resources being performed to obfuscate activity and prevent tampering. In some embodiments, the VM 140 interprets the jump operations, branches, etc., and executes the original computer program by distributing the set of instructions according to modified instructions. In some implementations, the VM 140 may simulate a plurality of computing resources to emulate a multi-thread/multi-core environment. While a VM is used throughout, any logical or physical compute component(s) can be used in its place so long as they achieve the disclosed functions. In some embodiments, the target device 130 may include a security module 150. The security module 150 may perform some or all of the functions/process described with respect to security service server 110 below in FIGS. 2-6, thereby causing code obfuscation to occur partially or fully on-device.

Security System Configuration

Figure 2:
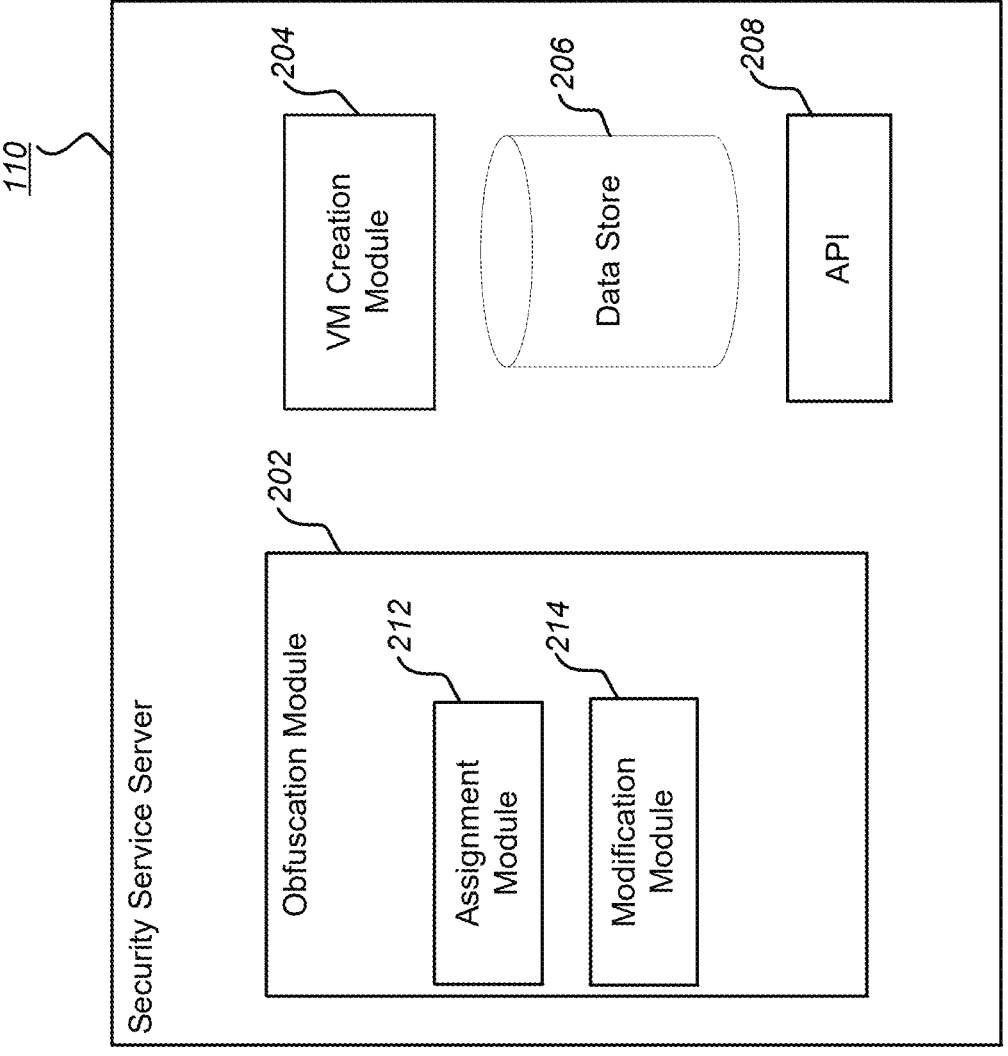
FIG. 2 illustrates one embodiment of modules of a security system, according to one or more embodiments.

FIG. 2 illustrates one embodiment of exemplary modules of a security system, according to one or more embodiments. The security service server 110 includes an obfuscation module 202, a virtual machine (VM) creation module 204, a data store 206, and an application program interface (API) 208. The modules depicted with respect to security service server 110 are exemplary; more or fewer modules, and databases may be used, consistent with the disclosure provided herein.

The obfuscation module 202 generates code obfuscation for a computer program. The computer program may include a set of instructions and a sequence in which the set of instructions are to be performed. The obfuscation module 202 may access the computer program from a development system during the build-time of the computer program. For example, a developer who develops an application using a development system may provide the program code of the application to the obfuscation module 202 in the security service server 110 to obfuscate at least a portion of the computer program to protect the computer program. In some implementations, the obfuscation module 202 may include an assignment module 212 and a modification module 214. The assignment module 212 determines a plurality of computing resources to be used when executing the computer program and assigns the set of instructions to the plurality of computing resources. By distributing the instructions across multiple computing resources, the control flow of the computer program becomes fragmented and more complex, making it more difficult for attackers to perform dynamic analysis, isolate or tamper one thread without potentially disrupting others or triggering failure conditions. The modification module 214 receives the assignment from the assignment module 212 and modifies the set of instruction with obfuscating instructions. The obfuscation module 202 may store the obfuscated computer program and/or transmit the obfuscated computer program to a target device 130 for execution.

In some embodiments, the assignment module 212 may select a set of instructions from the plurality of instructions for obfuscation according to a set of selection criteria. In some implementations, whether code is security sensitive is a selection criterion. The assignment module 212 may select a set of instructions for obfuscation when determining that the set of instructions includes security sensitive code. Security sensitive code may refer to code with critical logic (e.g., business logic, authentications, etc.) and/or code used for preventing reverse engineering (e.g., cryptographic operations, digital rights management (DRM), etc.). In some implementations, the assignment module 212 may analyze the sequence of the set of instructions and determine whether to obfuscate the instructions based on the type of sequence, e.g., whether including existing control flow or not.

The assignment module 212 may determine a plurality of computing resources for executing the set of instructions. In some implementations, the plurality of computing resources may be a set of resources available to a target device 130 for executing an obfuscated computer program. In one example, the target device may distribute the obfuscated computer program across the plurality of computing resources. While a single one of the plurality of computing resources may be computationally capable of performing an entirety of the obfuscated computer program, execution may nonetheless be distributed across the computing resources (e.g., across four cores, where one core is sufficient) in order to render reverse engineering of executed activity more difficult to a malicious observer. In some implementations, the assignment module 212 may access the computing resources and determine which computing resources are available of executing the instruction. For example, the assignment module 212 may determine the idle or otherwise available processor cores, threads, or computing resources that are free to take on tasks at a given moment.

The assignment module 212 assigns the set of instructions to be distributed among the plurality of computing resources for execution. For example, the assignment module 212 may split up the set of instructions and assign the instructions to multiple computing resources. Each of these computing resources will handle the assigned parts of the instructions. For example, in traditional a multi-thread environment, Thread 1, Thread 2, Thread 3, etc. may be assigned to execute Instruction A, Instruction B, Instruction C, respectively. Normally, each thread would execute its assigned instruction, and all four threads run instructions concurrently, allowing the program to process all the instructions in parallel. Here, with the obfuscation method, the set of instructions are obfuscated to instruct which thread runs which specific instruction in the obfuscated computer program. As the obfuscated computer program proceeds, while the assigned thread T1 is running the particular instruction, the other threads are idle. When the obfuscated computer program proceeds to the next instruction, the assigned thread may become T2. Then T2 executes this next instruction and all other threads become idle. In this way, at any given time, only one thread is executing the obfuscated computer program, which makes as if the obfuscated program jumps from one thread to another. Additional details regarding the obfuscation method are discussed below.

The modification module 214 modifies the set of instructions with at least an obfuscating instruction. In some implementations, the modification module 214 may inject an artificial control flow into a previously contiguous sequence of instructions. In some implementations, the modification module 214 may modify an existing control flow in the computer program to make it different and/or more complicated than the original control flow. For instance, when receiving the set of instructions, the modification module 214 may analyze the sequence in which the set of instruction are to be performed. In one case, the modification module 214 determines that the set of instructions to be performed is a contiguous sequential order with no branches. The modification module 214 may add an artificial control flow to the sequence. The modification module 214 may modify one or more instructions in the set to one or more corresponding basic blocks. In some cases, the modification module 214 may modify the control flow of execution, which causes the computer program to take different paths depending on certain conditions or repeat actions multiple times. For example, the control flow mechanisms may include: "if" statements that redirect the program's execution, allowing it to skip over certain instructions or jump to different sections of code; loops (such as "for" or "while" loops) that cause the program to repeatedly execute a block of instructions until a condition is no longer true. Additionally, function calls allow the program to jump to a different section of code, execute a set of instructions there, and then return to the original sequence of execution.

In some implementations, the modification module 214 may access the data store 206 to select an obfuscating instruction to modify a specific instruction (e.g., adding a set of pre-generated instructions with the original instruction to create a basic block). In some implementations, the modification module 214 may access the data store 206 to retrieve a template for modifying the original instructions. For example, a template may define how to modify an instruction based on the instruction type, such as adding jump operations, synchronization operations, etc. The modification module 214 may encode the template with an original instruction to create a basic block, adding a control flow to the computer program.

In another case, the modification module 214 may determine that the set of instructions include an existing control flow, such as branches. The modification module 214 may further determine the type of the existing control flow, e.g., conditional branches or non-conditional branches. Based on the type of the existing control flow, the modification module 214 may determine how to modify the existing control flow. For example, for a non-conditional branch, the modification module 214 may add incorrect target address and jump operations, and for a conditional branch, the modification module 214 may invert the conditional logic and the like. Similarly, the modification module 214 may access the data store 206 to retrieve pre-generated obfuscating instructions and/or template to modify the existing control flow in the computer program. These approaches obfuscate the control flow of the computer program, making it more complex and harder to follow, thereby increasing the difficulty of reverse engineering. The security service server 130 (e.g., VM creation module 204) may create a VM to be deployed by a target device 130. When executing the obfuscated computer program, the target device 130 may deploy the VM to interpret the instructions in the obfuscated computer program including the obfuscating instructions. For example, the VM may change values of conditional branches, correct target address, and the like. In this way, The VM understands the obfuscating instructions, such as the added incorrect target address, jump operations, inverted condition logic and the like. In this way, during execution of an obfuscated computer program, the obfuscating instructions do not affect the original flow logic and the final output.

Adding Artificial Control Flow

Figure 3:
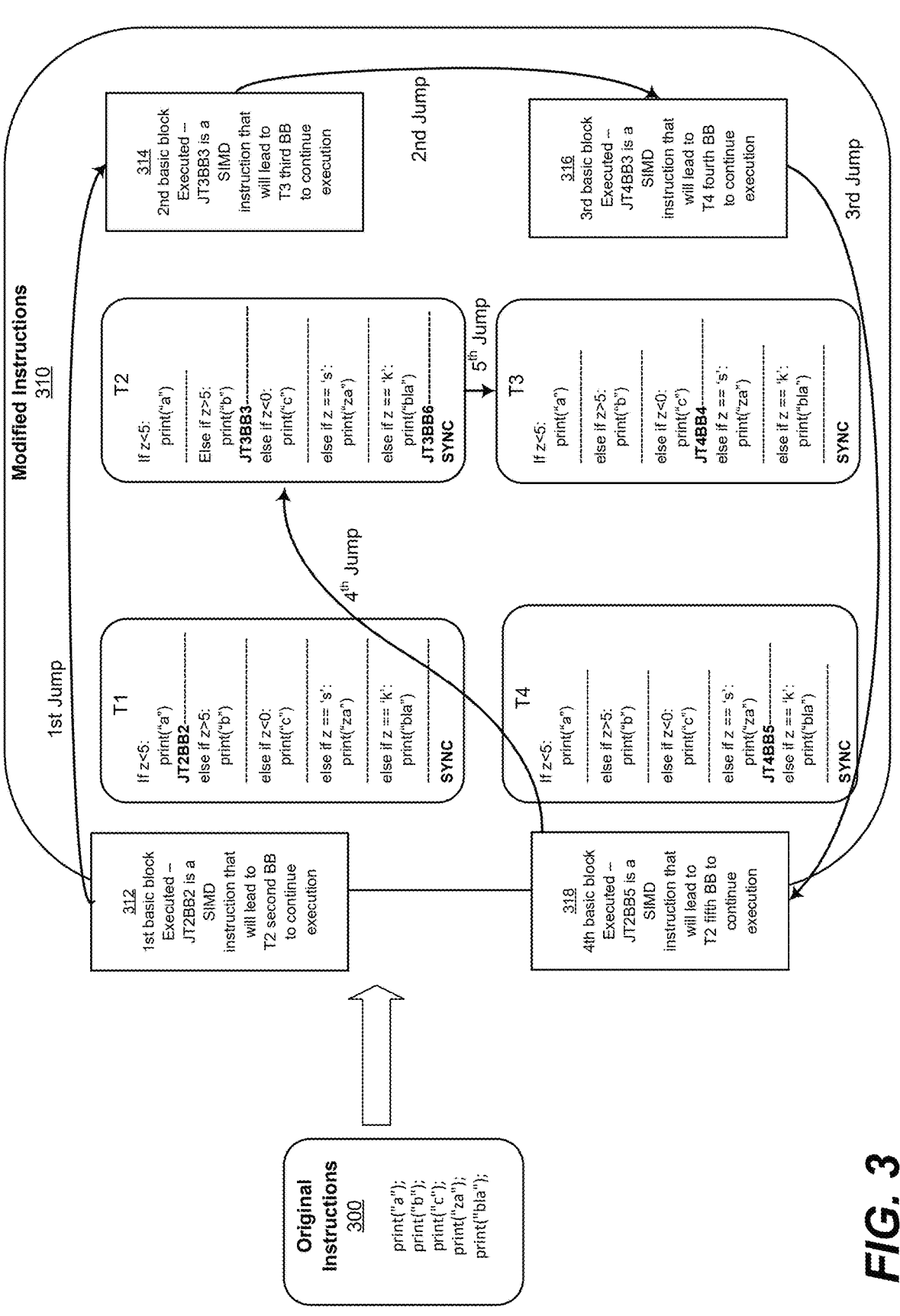
FIG. 3 illustrates an example obfuscation method by adding an artificial control flow to a set of instructions, according to one or more embodiments.

FIG. 3 illustrates an example obfuscation method by adding an artificial control flow to a set of instructions, according to one or more embodiments. In some embodiments, a set of instructions in a computer program may include a straight-line sequence with no branches except at the entry and exit points. When the set of instructions starts executing, every instruction in the set is executed sequentially until an end of the set of instructions is reached, without any interruptions or jumps. As shown in FIG. 3, a set of instructions 300 may include instructions, "print ("a"); print ("b"); print ("c"); print ("za"); print ("bla")." This set of instructions has no jumps or branching instructions (like "if" conditions or loops), forming a basic block that can be executed at one computing resource (e.g., one thread). To obfuscate this set of instructions, the modification module 214 may add artificial control flows, such as a conditional statement, a loop, and the like, which causes the original sequence of the instructions to split and be divided into multiple basic blocks. Each basic block may account for the different paths the computer program may take and be executed at a different computing resource.

In one implementation, the modification module 214 may modify the set of original instructions 300 by adding additional instructions, such as redundant conditions, branches, and the like. In some cases, the added instructions form one or more basic blocks with the original instructions. In one instance, the modification module 214 adds an obfuscating instruction to a basic block: JTnBBz (Jump Thread n Basic Block z), which instructs a target thread (n) to execute a particular basic block (z). In one example, as shown in FIG. 3, the first instruction in the set of original instructions 300 is "print ("a")". The modification module 214 modifies this first instruction to a first step 312 to be executed. The modified instructions 310, while including the original first instruction, includes multiple "if/else" statements with a value condition based on z, effectively splitting the original basic block into several basic blocks with an implicit conditional control flow. The first step 312 further includes an obfuscating instruction "JT2BB2", instructing Thread 2 to execute Basic Block 2 once the first instruction "print ("a")" is completed. Thus, once completing the first instruction, the execution of the computer program jumps from Thread 1 (e.g., one computing resource) to Thread 2 (e.g., another computing resource) for executing the second step 314. In some implementations, the set of modified instructions 310 may include a set of instructions, each corresponding to an original instruction in the set. With the set of modified instructions 310, the execution of the computer program may start from Thread 1, jumps to Thread 2 for the second step 314, jumps to Thread 3 for the third step 316 and the like. The instruction, JTnBBz, acts as a command to tell thread n to perform the execution of basic block z, while all other threads remain idle or continue with their respective tasks. While the set of modified instructions 310 are executed from one basic block to another from one thread to another, the set of original instructions 300 are executed in the original sequence, e.g., from "print ("a")" to "print ("b")" to "print ("c")" and so on.

In some implementations, the modification module 214 may include a synchronization instruction (SYNC) in each basic block to coordinate the execution of computing resources in the multi-thread/multi-core environment. When a thread encounters a SYNC instruction, it stops its execution temporarily and waits for other threads in the program to reach the same synchronization point.

Modifying Existing Control Flow

In some embodiments, the set of instructions may include an existing control flow, and the modification module 214 may introduce obfuscation by modifying the existing control flow. In some implementations, the set of instructions may include a non-conditional branch which is an instruction that transfers control unconditionally (e.g., without checking a condition). When the computer program encounters such an instruction, it immediately redirects execution to the specified target location (e.g., a basic block or a function). The modification module 214 may modify a non-conditional branch to point to a spurious location and inject a JTnBBz instruction at the beginning of that location. A spurious location is an intentionally incorrect or "fake" target address. Instead of directing the computer program to the actual intended target (e.g., the correct basic block), the modification module 214 modifies the non-conditional branch to point to this spurious location. When execution reaches the spurious location, a JTnBBz instruction is inserted at the beginning of that location which redirects the execution to the correct basic block (z). By adding this intermediate step as a "detour", the original control flow is disguised but computer program still behaves as intended, despite the initial misdirection.

In some embodiments, the set of instructions may include a conditional branch, and the modification module 214 may modify the targets of conditional branches to invert the conditional logic and avoid cycles in the control flow. A conditional branch is an instruction that makes a decision based on a condition (e.g., a comparison or Boolean check). If the condition evaluates to true, the computer program branches to one target (the "true" branch); if false, it branches to a different target (the "false" branch). In one example, the modification module 214 may invert the targets of a conditional branch by swapping the logic of the branch so that the true and false branches point to different targets. In another example, to avoid creating cyclic control flow (where execution could endlessly loop between certain blocks), the modification module 214 may split the entry points of the basic blocks for the true and false branches. With the JTnBBz instructions, the modification module 214 ensures that the computer program remains acyclic and behaves as intended, despite the inversion of logic.

In some embodiments, the modification module 214 may introduce obfuscation to the computer program at two levels: intra-function (local control flow) and inter-function (global control flow). Intra-function control flow involves the control flow within a single function, such as decisions and jumps within that function. Inter-function control flow refers to the way different functions in the computer program interact with each other, such as function calls, returns, and how data is passed between functions. In some implementations, the modification module 214 may obfuscate the control flow by hiding local control flow at the global level, for example, manipulating the way control flows within a single function so that it becomes less obvious. In some examples, the modification module 214 may use function merging and/or function splitting which alter how the computer program appears to interact with its functions, making it more difficult for an observer to follow the control flow and understand the underlying logic.

Referring back to FIG. 2, the obfuscation module 202 generates an obfuscated computer program with the modified instructions. In some implementations, the obfuscation module 202 stores the obfuscated computer program at a data store. In some implementations, the obfuscation module 202 may transmit the obfuscated computer program to a target device (e.g., target device 130) for execution.

The VM creation module 204 creates a VM (e.g., VM 140) to be implemented at the target device 130. While a VM is used throughout, any logical or physical compute component(s) can be used in its place so long as they achieve the disclosed functions. In some implementations, the VM may operate on bytecode of the obfuscated computer program that is generated by compiling the source code. When receiving an obfuscated computer program, a target device 130 may deploy the VM to interpret the instructions in the obfuscated computer program. Because the VM is created by the VM creation module 204 of the security service server 110 and designed to process obfuscated code, the VM understands the obfuscating instructions (such as, JTnBBz, SYNC) used in creating the obfuscated computer program and achieves the original control flow. As the example in FIG. 2, the VM understands that the JTnBBz instruction means jumping to thread n to perform the execution of basic block z. Additionally, this example uses an "if/else" statement with a value z. When interpreting the obfuscated computer program, the VM changes the value of z in each thread so that only the correct "if/else executes." In one example, when the computer program jumps to T2 basic block 2, the VM set value z to >5 so the "print ('b')" instruction executes but none of other instruction executes. The VM changes the values of the variable z within the thread that is running the correct instruction to cause the correct "if" statement to evaluate as true. In some cases, the JTnBBz instruction may cause the computer program directly to jump to the basic block that represents instructions to be executed for a particular if-case. In some examples, the value of z (and the condition depending on it) may be spurious so that the value will not be evaluated or checked, and there is no need to set a correct value of z.

In some implementations, the VM at the target device 130 transform the set of modified instructions in the obfuscated computer program to one or more instruction vectors which specify the assignment of the instructions to the computing resources (e.g., threads, cores, etc.). In some embodiments, an instruction vector may contain a SIMD (Single Instruction, Multiple Data) vector instruction. A SIMD vector instruction refers to a parallel computing architecture where a single instruction is executed simultaneously on multiple pieces of data. A SIMD vector instruction may be executed directly on hardware, using native SIMD support (e.g., AVX, NEON) or emulated in software. In some embodiments, the VM may transform the set of modified instructions using vectorization. Vectorization refers to transforming scalar operations, which operate on single data elements at a time, into vector operations that process multiple data elements simultaneously using SIMD vector instructions. A SIMD vector instruction may include a masking technique that designates which elements in the instruction vector are active and which are ignored during execution. For example, each bit in the mask of a SIMD vector instruction corresponds to an element within the SIMD vector instruction. A value of 1 in the mask indicates that the operation should be applied to the corresponding element, while a value of 0 signifies that the element should be skipped or ignored. In some embodiments, the VM may use the masking technique with the assignment of computing resources in the obfuscated computer program to selectively enable or disable one or more computing resources during an execution. In a multi-thread environment, the element may be a thread, and the mask may be used to select a specific thread for executing a specific instruction/basic block. For example, in a multi-thread environment with four threads (T0, T1, T2, T3), a mask [1, 0, 0, 0] means that only Thread T0 will execute the instruction while the other three threads are idle.

In one example, the VM may broadcast the instruction vectors to multiple processing units (e.g., threads, cores, etc.). In some implementations, threads in a multi-thread environment run the same interpreter, e.g., four threads each of which runs its own interpreter. If a JTnBBz (e.g., JT1BB3) instruction is issued, all four interpreters receive it simultaneously. However, only the interpreter running on thread Tn (e.g., T1) recognizes that it needs to act and proceeds to execute basic block z (e.g., basic block 3). The interpreters on threads T0, T2, and T3 will ignore the instruction and wait for their next instruction. The combination of the JTnBBz instruction (in the obfuscated computer program) and the SIMD vector instruction allows the obfuscated computer program to be executed in a multi-thread/multi-core environment with only one thread/core being executing the computer program at any given time. In the meanwhile, the redundant conditions, branches, or code that was added or modified to the original instructions do not affect the original flow logic and the final output so that the computer program "falls back" to its intended flow despite the apparent complexity.

In some embodiments, the VM may simulate the plurality of computing resources. For example, if SIMD hardware support is unavailable, the VM may emulate the behavior of computing resources in software. As the VM interprets the instructions in a SIMD vector instruction, the VM performs operations such as mathematical computations, memory access, or control flow changes, mimicking the behavior of real hardware but in a software-based, virtualized environment.

The data store 206 may be configured to store example instructions or sequence of instructions, and the example obfuscating instructions, such as jump, loops, JTnBBz, etc.

In some embodiments, the security service server 110 may provide an API 208, a software interface that provides functions and tools for users to create obfuscation at build time of a computer program. The API 208 may be used to identify the set of instructions for protection, determine a plurality of computing resources, and/or modify the computer program with obfuscating instructions.

Process of Obfuscating Computer Program with Breaking Control Flow

FIG. 4 illustrates one embodiment of a process 400 for obfuscating a set of instruction in a computer program, according to one or more embodiments. In various embodiments, the process includes different or additional steps than those described in conjunction with FIG. 4. Further, in some embodiments, the steps of the process may be performed in different orders than the order described in conjunction with FIG. 4. The process described in conjunction with FIG. 4 may be carried out by the security service server 110 in various embodiments.

As shown in FIG. 4, the assignment module 212 accesses 402 a computer program which includes a set of instructions and a sequence in which the set of instructions are to be performed. The assignment module 212 determines 404 a plurality of computing resources available to perform the set of instructions. A single one of the plurality of computing resources is computationally capable of performing an entirety of the set of instructions. The assignment module 212 assigns 406 the set of instructions to be distributed among the plurality of computing resources for execution. The modification module 214 modifies 408 the set of instructions with at least one obfuscating instruction that that instructs at runtime for the computer program to jump from one computing resource to another computing resource of the set of computing resources. In one embodiment, the obfuscating instruction may include injecting an artificial control flow into a previously contiguous sequence of instructions; and in another embodiment, the obfuscating instruction may include modifying an existing control flow in the computer program. The obfuscation module 202 may transmit 410 the obfuscated computer program including the set of modified instruction to a target device for execution. In some embodiments, the target device deploys a VM that is created by the security service server 120. The VM interprets the set of modified instruction and restores the original control flow in the computer resource. In some embodiments, the VM translates 412 the set of modified instructions to one or more instruction vectors which specify the assignment of the instructions to the computing resources. In some implementations, the instruction vector is a SIMD instruction vector. In this way, during runtime of the obfuscated computer program, the execution jumps from one computing resource to another based on the assignment in a multi-thread/multi-core environment. Only one thread/core is executing the computer program at any given time. In this way, the obfuscation does not affect the original flow logic and the final output so that the computer program "falls back" to its intended flow despite the apparent complexity.

Figure 5:
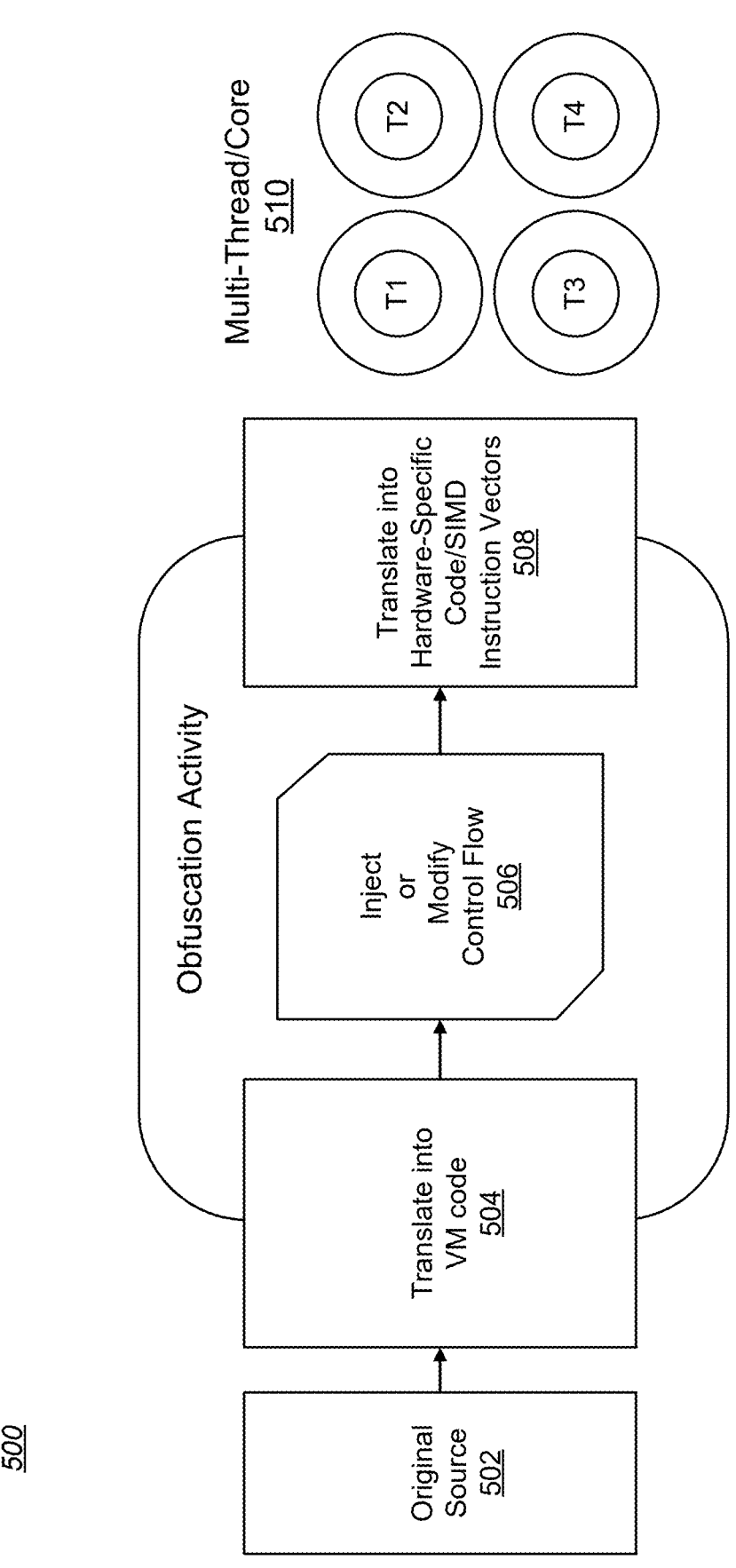
FIG. 5 illustrates one embodiment of a process for obfuscating a set of instruction in a computer program in a VM environment, according to one or more embodiments.

FIG. 5 illustrates one embodiment of a process 500 for obfuscating a set of instruction in a computer program in a VM environment, according to one or more embodiments. In various embodiments, the process includes different or additional steps than those described in conjunction with FIG. 5. Further, in some embodiments, the steps of the process may be performed in different orders than the order described in conjunction with FIG. 5. The process described in conjunction with FIG. 4 may be carried out by the security service server 110 in various embodiments.

As shown in FIG. 5, the assignment module 212 of the obfuscation module 202 receives an original source code 502 of a computer program. The source code may include a set of instructions to be obfuscated. The original source code 502 may be written in a high-level language (e.g., C, Python, Java). The original source code 502 may, in some embodiments, be written in binary form (i.e. translated to machine code, or some form of intermediate representation).

The VM creation module 204 of the security service server 110 may translate the original source code 502 to a set of VM code 504. The set of VM code 504 may be executed by a VM of a target device rather than directly on the hardware of the target device. In some embodiments, the VM creation module 204 may create a VM that serves as an intermediary layer, and the original source code 502 is translated into instructions that the VM can execute. Translating the original source code 502 to the set of VM code 504 may include translating the high-level source code into lower-level instructions that the VM understands. With the set of VM code 504, the modification module 214 may modify the set of instructions in the computer program to obfuscate the original source code 502. For example, the modification module 214 may inject 506 an artificial control flow to the instructions in the original source code 502 or modify 506 an existing control flow of the instructions in the original source code 502. The security service server 110 generates the obfuscated computer program and transmits the obfuscated computer program to a target device 130. The target device 130 may deploy a VM to interpret the obfuscated computer program. In some embodiments, the VM deployed by the target device 130 may be provided by the security service server 110. For instance, the VM may be created by the VM creation module 204. In this way, the VM deployed at the target device 130 understands the obfuscating instructions used by the security service server 110 for creating the obfuscated computer program. The VM deployed at the target device 130 translates 508 the modified instructions in the obfuscated computer program into one or more instruction vectors. The instructions vectors may specify the assignment of instructions among a plurality of computing resources, such as threads, cores, etc. In some embodiments, an instruction vector is a hardware-specific code or a SIMD instruction vector. In this way, in a multi-thread environment, the instruction vectors may be distributed across threads and run on multiple threads.

Figure 6:
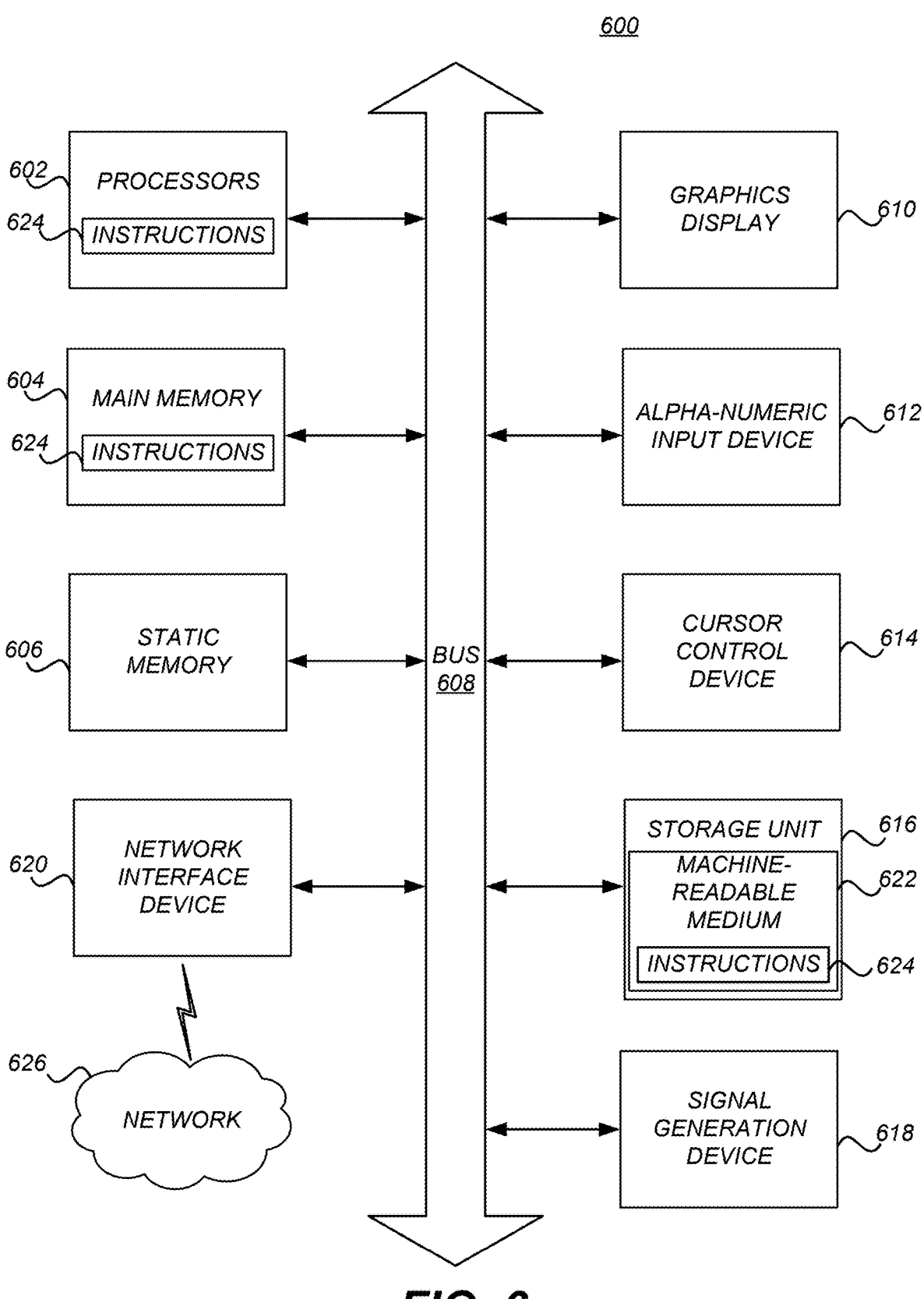
FIG. 6 is a block diagram illustrating components of an example machine able to read instructions from a machine-readable medium and execute them in a processor (or controller), according to one or more embodiments.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but is not limited to, data repositories in the form of solid-state memories, optical media, and magnetic media.

Figure 7A:
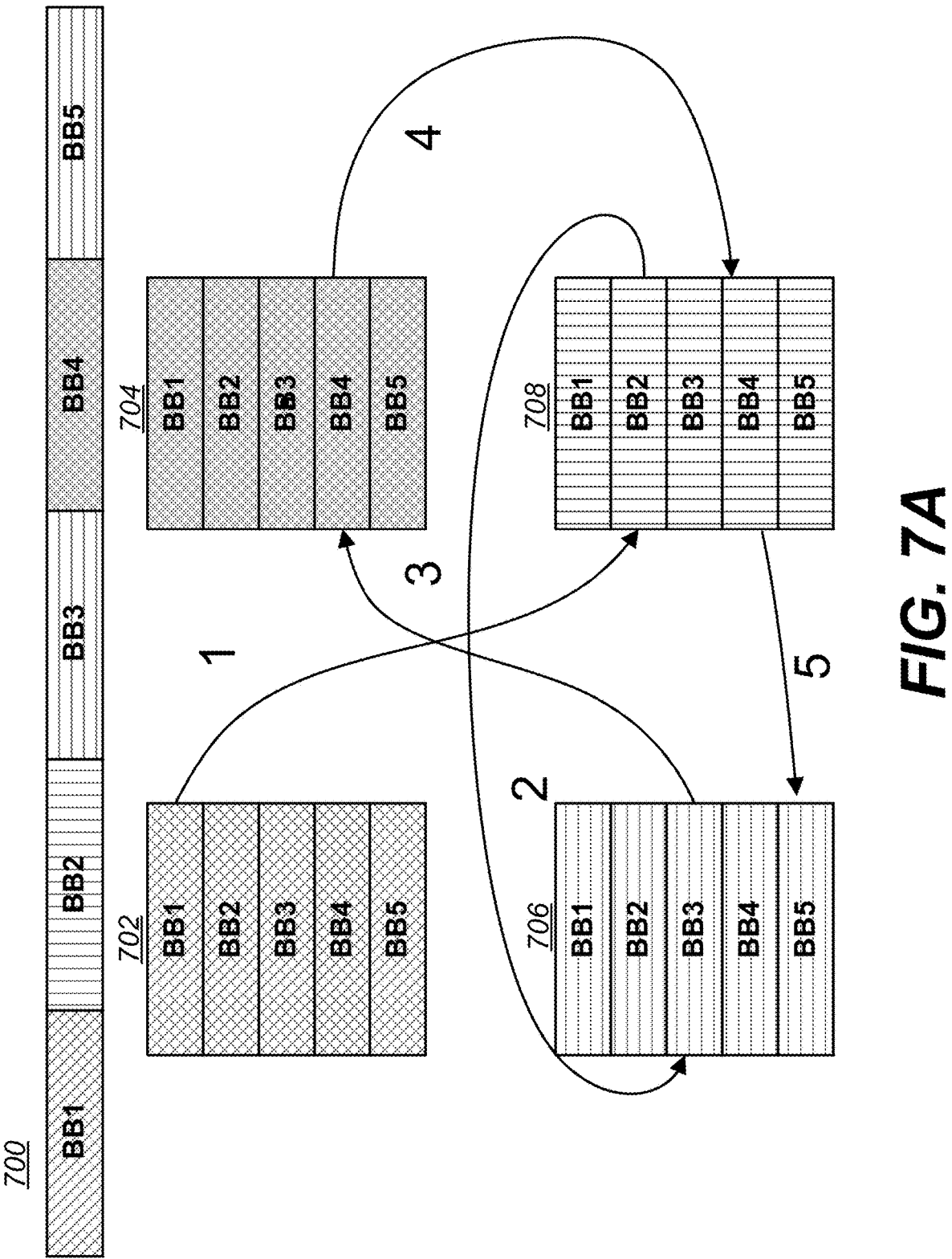
FIG. 7A illustrates an exemplary simplified diagram showing obfuscation by way of an artificial control flow, according to one or more embodiments.

FIG. 7A illustrates an exemplary simplified diagram showing obfuscation by way of an artificial control flow, according to one or more embodiments. As depicted in FIG. 7A, obfuscation module 202 generates an instruction vector that encodes an execution sequence 700 on a per-core (or thread; wherever cores are referenced, threads are equally included) and basic block basis. The sequence may be determined heuristically or randomly. Through the use of special vector instructions, obfuscation module 202 may instruct an out-of-context execution that controls each core with a single sequence of instructions. That is, as depicted, the instructions prescribe execution of BB1 in core 702, followed by BB2 in core 708, followed by BB3 in core 706, followed by BB4 in core 704, followed by BB5 in core 706. Each of cores 702, 704, 706, and 708 may include an entirety of the program code. However, for an attacker looking at an individual core to monitor what executes, the attacker would be left puzzled, in that only a small portion of program code execution would be seen through the monitoring.

Figure 7B:
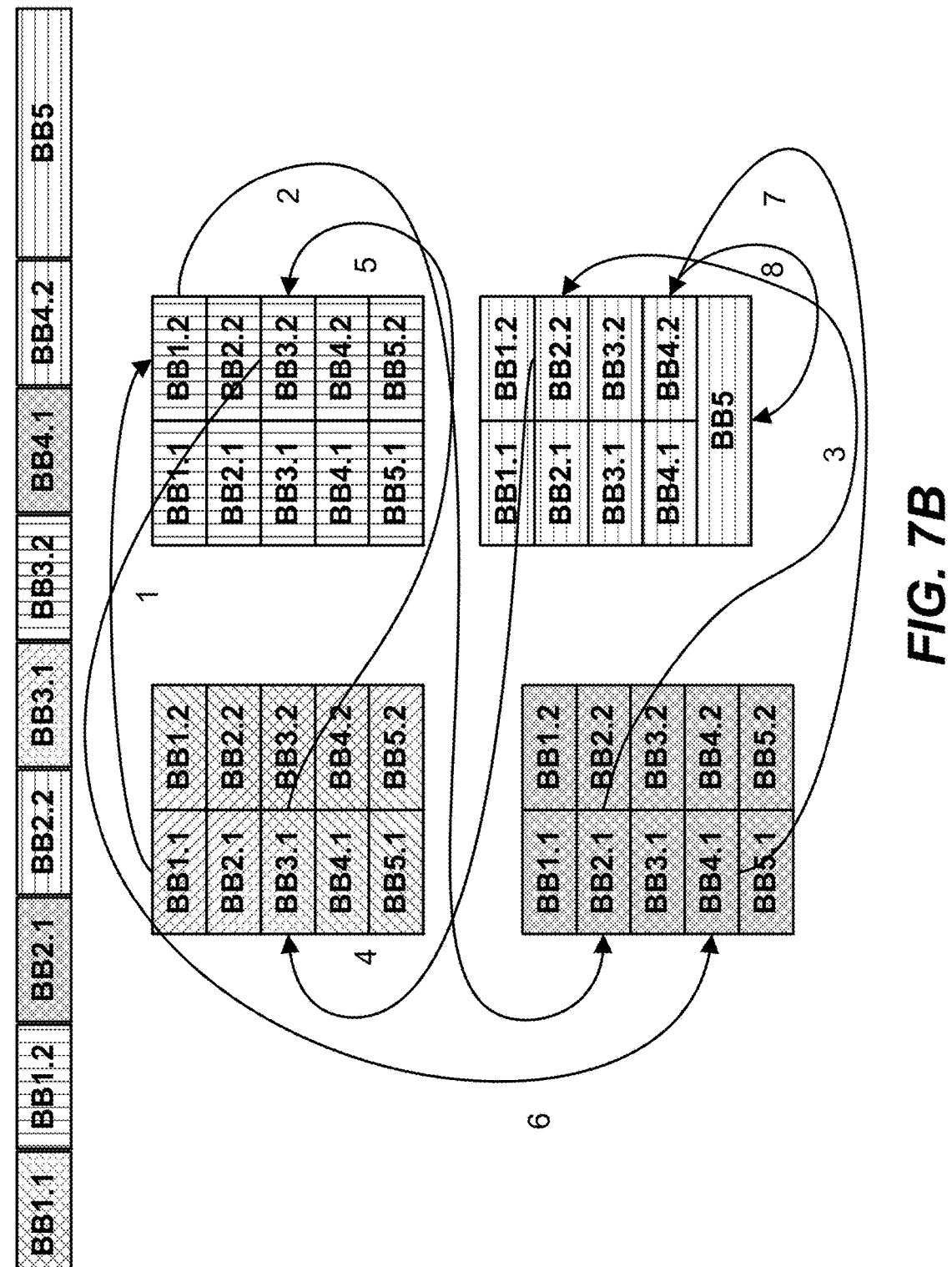
FIG. 7B illustrates an exemplary simplified diagram showing obfuscation similar to that of FIG. 7A, but additionally including dummy blocks, according to one or more embodiments.

FIG. 7B illustrates an exemplary simplified diagram showing obfuscation similar to that of FIG. 7A, but additionally including phony blocks, according to one or more embodiments. As depicted in FIG. 7B, obfuscation module 202 generates an instruction vector that encodes an execution sequence 710 in a manner similar to that of execution sequence 700, except that each basic block can optionally be split into phony basic blocks in order to further shuffle the execution among the different cores. As depicted in FIG. 7B, five basic blocks (BB1-BB5) are each divided into two blocks (e.g., a phony block and a real block), and eight control flow transitions are encoded into the vectorized instructions that controls all of the cores in a single sequence.

The phony blocks may include reachable code and/or unreachable code. An attacker studying execution of a basic block may be further puzzled by the addition of a phony block as part of a basic block, and may spend analysis cycles on the phony block to determine its functionality in relation to the portion of the basic block that did execute, further adding noise to a bad actor's malfeasance attempts.

Figure 8A:
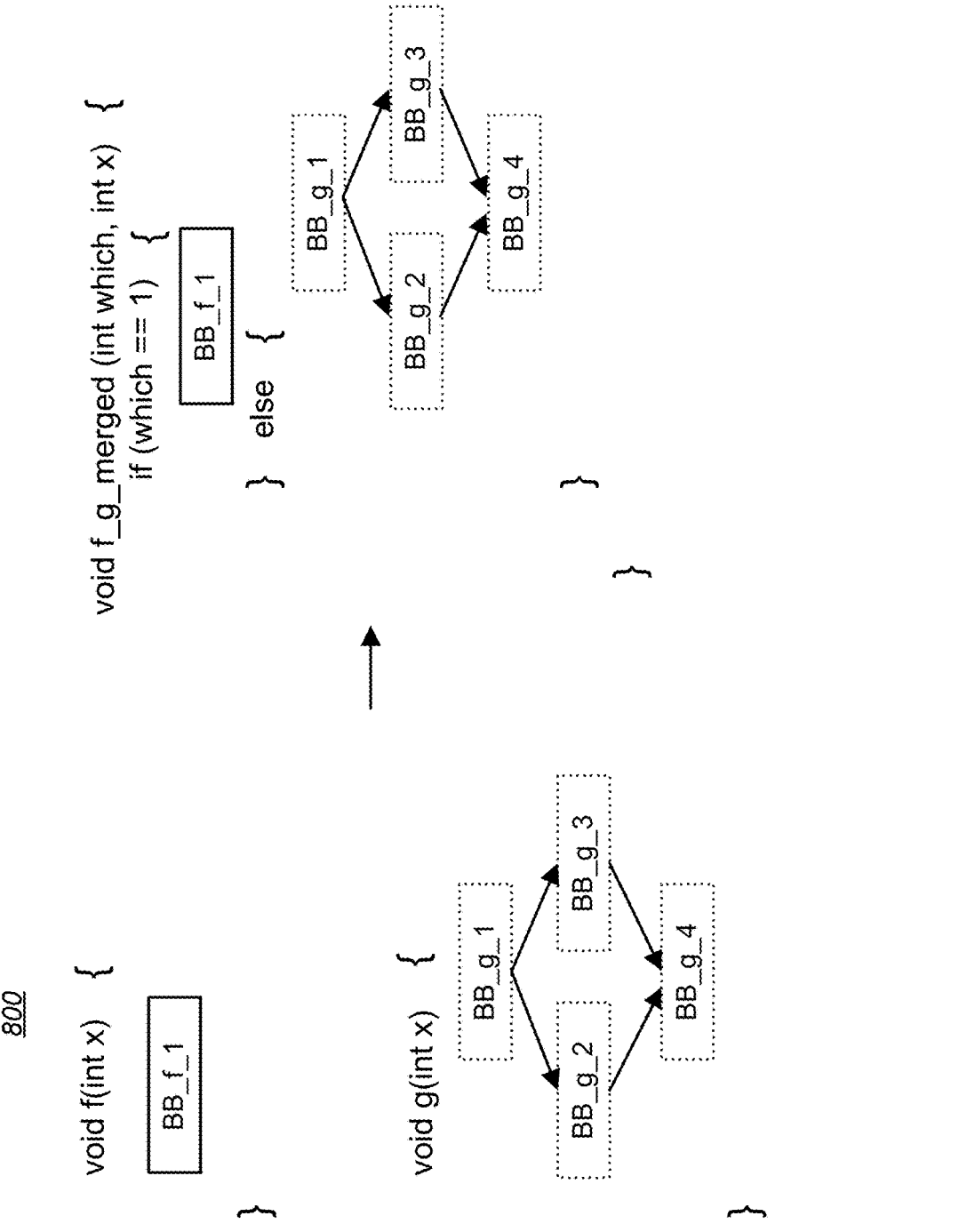
FIGS. 8A-8B illustrate exemplary techniques for merging and splitting functions, in accordance with one or more embodiments.
Figure 8B:
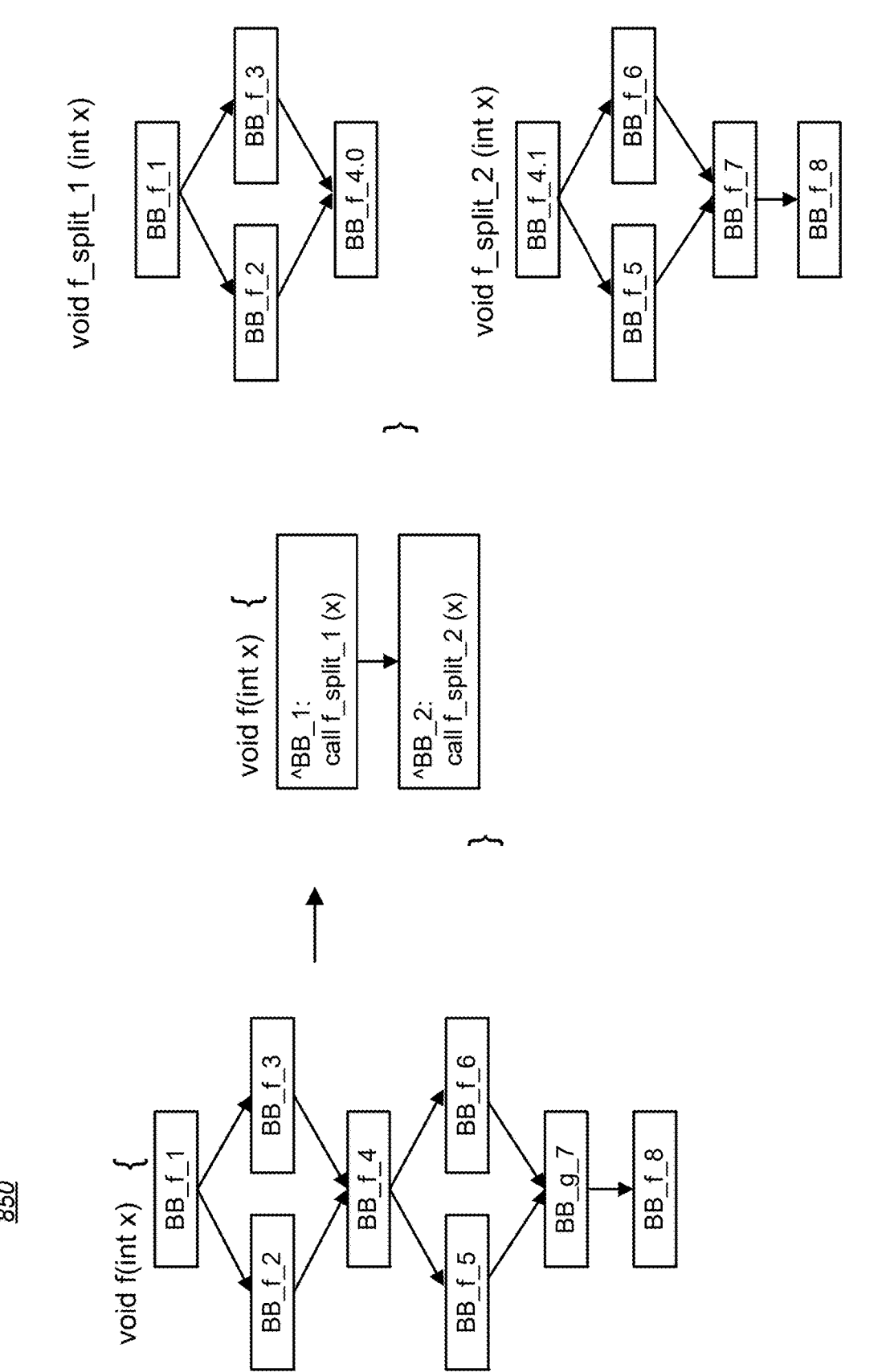

FIGS. 8A-8B illustrate exemplary techniques for merging and splitting functions, in accordance with one or more embodiments. FIGS. 8A-8B illustrate the application of the above principles to blocks involving functions. As depicted in FIG. 8A, function f, and function g, may be merged into function f_g_merged by obfuscation module 202. The merge may be done using basic blocks as described with respect to FIGS. 7A-7B, using each as a basic block and making the merged function resemble a same sequence. This would ensure that an attacker would need to analyze f_g_merged in order to tamper with the code, even though function f_g would never be called per se. If a program is to call function f, this would occur using a modified control flow that untangles function from f_g_merged. This process is similar to that of FIG. 7B, except that rather than use a dummy block and a real block, in this case both of the blocks for each function are reachable code blocks. This further adds noise to any malfeasance attempt by a bad actor.

In order to merge functions, if/else code may be used to ensure that unrelated functions can be combined without consequences against the code's operations. In order to generate instructions as to what functions to execute in each of the different cores, a vector instruction may be used, which may be a one-shot instruction that in a single block of code can program all of the cores to execute along the obfuscation line of the instructions. This merging enables the program to jump from one instruction to another one without a specific relationship. This is intransient—the program can execute because it is able to act without reference to state, as it can execute one move in a core and do a next move in another core.

FIG. 8B performs an opposite function to that of FIG. 8A of splitting functions, rather than merging them. As depicted in FIG. 8B, a larger function may be decomposed by obfuscation module 202 into smaller functions. As an analogy, a basic block can be broken down where execution is shuffled through different cores, similar to FIG. 7B. That is, as depicted in FIG. 8B, the 3 functions on the right can each be executed on different cores, or can have each element executed on a different core, in analogous fashion to FIG. 7B, where multiple segments of a basic block have reachable and functional code. Obfuscation module 202 may either merge together functions or split together the functions in multiples. When the function(s) are executed, an observer would just see a sequence of instructions, and be unable to reconstruct the original control flow because the transformation into vectorized instructions is performed to function in parallel blocks, in that small bricks of programs are shuffled them among the cores.

References throughout the specification to "basic blocks" are exemplary; the same principles apply at the function level, where functional block may be obfuscated in the same fashion.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skilled in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

accessing a computer program comprising a set of instructions and a sequence in which the set of instructions are to be performed;

determining a plurality of computing resources available to perform the set of instructions, wherein a single one of the plurality of computing resources is computationally capable of performing an entirety of the set of instructions;

assigning the set of instructions to be distributed among the plurality of computing resources for execution;

modifying the set of instructions with at least one obfuscating instruction to generate an obfuscated computer program, the at least one obfuscating instruction instructing at runtime for the computer program to jump from one computing resource to another computing resource of the set of computing resources;

transmitting the obfuscated computer program to a target device, wherein the target device is configured to execute the obfuscated computer program and achieve a same output as the computer program would output without obfuscation;

creating a virtual machine (VM) to be deployed at the target device; and causing the target device to deploy the VM to interpret the obfuscated computer program when the obfuscated computer program is executed, wherein the VM translates the obfuscated computer program to an instruction vector which specifies the assignment of the instructions to the computing resources.

2. The method of claim 1, wherein modifying the set of instructions with at least one obfuscating instruction comprises:

adding an artificial control flow to the sequence of the set of instructions.

3. The method of claim 1, wherein modifying the set of instructions with at least one obfuscating instruction comprises:

modifying an existing control flow within the sequence of the set of instructions.

4. The method of claim 1, wherein the instruction vector uses SIMD (Single Instruction, Multiple Data) instructions to trigger special behavior on the VM.

5. The method of claim 1, wherein the plurality of computing resources are simulated by a virtual machine (VM) in a VM environment.

6. A non-transitory computer readable medium configured to store instructions, the instructions when executed by one or more processors causing the one or more processors to perform operations comprising:

accessing a computer program comprising a set of instructions and a sequence in which the set of instructions are to be performed;

determining a plurality of computing resources available to perform the set of instructions, wherein a single one of the plurality of computing resources is computationally capable of performing an entirety of the set of instructions;

assigning the set of instructions to be distributed among the plurality of computing resources for execution;

modifying the set of instructions with at least one obfuscating instruction to generate an obfuscated computer program, the at least one obfuscating instruction instructing at runtime for the computer program to jump from one computing resource to another computing resource of the set of computing resources;

transmitting the obfuscated computer program to a target device, wherein the target device is configured to execute the obfuscated computer program and achieve a same output as the computer program would output without obfuscation;

creating a virtual machine (VM) to be deployed at the target device; and causing the target device to deploy the VM to interpret the obfuscated computer program when the obfuscated computer program is executed, wherein the VM translates the obfuscated computer program to an instruction vector which specifies the assignment of the instructions to the computing resources.

7. The non-transitory computer readable medium of claim 6, wherein modifying the set of instructions with at least one obfuscating instruction comprises:

adding an artificial control flow to the sequence of the set of instructions.

8. The non-transitory computer readable medium of claim 6, wherein modifying the set of instructions with at least one obfuscating instruction comprises:

modifying an existing control flow within the sequence of the set of instructions.

9. The non-transitory computer readable medium of claim 6, wherein the instruction vector uses SIMD (Single Instruction Multiple Data) instructions to trigger special behavior on the VM.

10. The non-transitory computer readable medium of claim 6, wherein the plurality of computing resources are simulated by a virtual machine (VM) in a VM environment.

11. A system comprising memory with instructions encoded thereon that, when executed by one or more processors, cause the one or more processors to perform operations comprising:

accessing a computer program comprising a set of instructions and a sequence in which the set of instructions are to be performed;

determining a plurality of computing resources available to perform the set of instructions, wherein a single one of the plurality of computing resources is computationally capable of performing an entirety of the set of instructions;

assigning the set of instructions to be distributed among the plurality of computing resources for execution;

modifying the set of instructions with at least one obfuscating instruction to generate an obfuscated computer program, the at least one obfuscating instruction instructing at runtime for the computer program to jump from one computing resource to another computing resource of the set of computing resources;

transmitting the obfuscated computer program to a target device, wherein the target device is configured to execute the obfuscated computer program and achieve a same output as the computer program would output without obfuscation;

creating a virtual machine (VM) to be deployed at the target device; and causing the target device to deploy the VM to interpret the obfuscated computer program when the obfuscated computer program is executed, wherein the VM translates the obfuscated computer program to an instruction vector which specifies the assignment of the instructions to the computing resources.

12. The system of claim 11, wherein modifying the set of instructions with at least one obfuscating instruction comprises:

adding an artificial control flow to the sequence of the set of instructions.

13. The system of claim 11, wherein modifying the set of instructions with at least one obfuscating instruction comprises:

modifying an existing control flow within the sequence of the set of instructions.

14. The system of claim 11, wherein the instruction vector uses SIMD (Single Instruction Multiple Data) instructions to trigger special behavior on the VM.

* * * * *